United States Patent [19]
Adamski

[11] 3,878,546
[45] Apr. 15, 1975

[54] ROLL FILM CAMERA WITH ELECTRICAL FILM FEEDING

[75] Inventor: Günter Adamski, Braunschweig, Germany

[73] Assignee: Rollei-Werke Franke & Heidecke, Braunschweig, Germany

[22] Filed: Nov. 19, 1973

[21] Appl. No.: 417,411

[30] Foreign Application Priority Data
Nov. 20, 1972 Germany............................ 2256795

[52] U.S. Cl. ................ 354/173; 352/121; 354/206; 354/210; 354/213; 354/217
[51] Int. Cl. ............................................ G03b 19/04
[58] Field of Search................ 95/31 EL; 95/31 DS; 352/121; 354/173, 206, 210, 213, 217

[56] References Cited
UNITED STATES PATENTS

| | | |
|---|---|---|
| 2,520,296 | 8/1950 | Williams ........................... 95/31 EL |
| 2,937,583 | 5/1960 | Redfield ...................... 95/31 EL X |
| 3,448,668 | 6/1969 | Nomura et al ..................... 95/31 EL |
| 3,543,659 | 12/1970 | Moore .............................. 95/31 EL |
| 3,598,033 | 8/1971 | Sasaki ............................. 95/31 EL |

Primary Examiner—Fred L. Braun
Assistant Examiner—Russell E. Adams, Jr.
Attorney, Agent, or Firm—Stonebraker & Shepard

[57] ABSTRACT

A roll film camera in which the film is advanced from one exposure position to another by an electric motor. An electric circuit includes a switch responsive to the presence or absence of film from the focal plane of the camera, so arranged that the motor will not operate when there is no film in the camera, thus avoiding unnecessary drain on the battery which powers the motor. An indexing mechanism cooperates in controlling the extent of winding movement from one exposure position to the next, and is adjustable in accordance with the number of exposures accommodated by the length of the film, such as 12 or 24 or 36 exposures.

10 Claims, 4 Drawing Figures

ROLL FILM CAMERA WITH ELECTRICAL FILM FEEDING

BACKGROUND OF THE INVENTION

Photographic cameras having motor driven film advance are known in the art, but these are usually heavy or bulky cameras intended for commercial or industrial use. As distinguished from these, the present invention relates to a compact and light weight camera suitable to be held in the hand and used by an amateur.

An object of the invention is the provision of simple, sturdy, and compact control mechanism for electrically driven film transport or film winding means, suitable and practical for use in a hand held amateur camera.

Another object is the provision of such control mechanism so designed that the film winding motor will not run when there is no film in the camera, thus avoiding useless drain on the battery which powers the motor.

A further object of the invention is the provision of mechanism which can be quickly adjusted for films of different lengths, such as those having 12 exposures, or 24 exposures, or 36 exposures.

DESCRIPTION OF THE PREFERRED EMBODIMENTS

Figure 1:
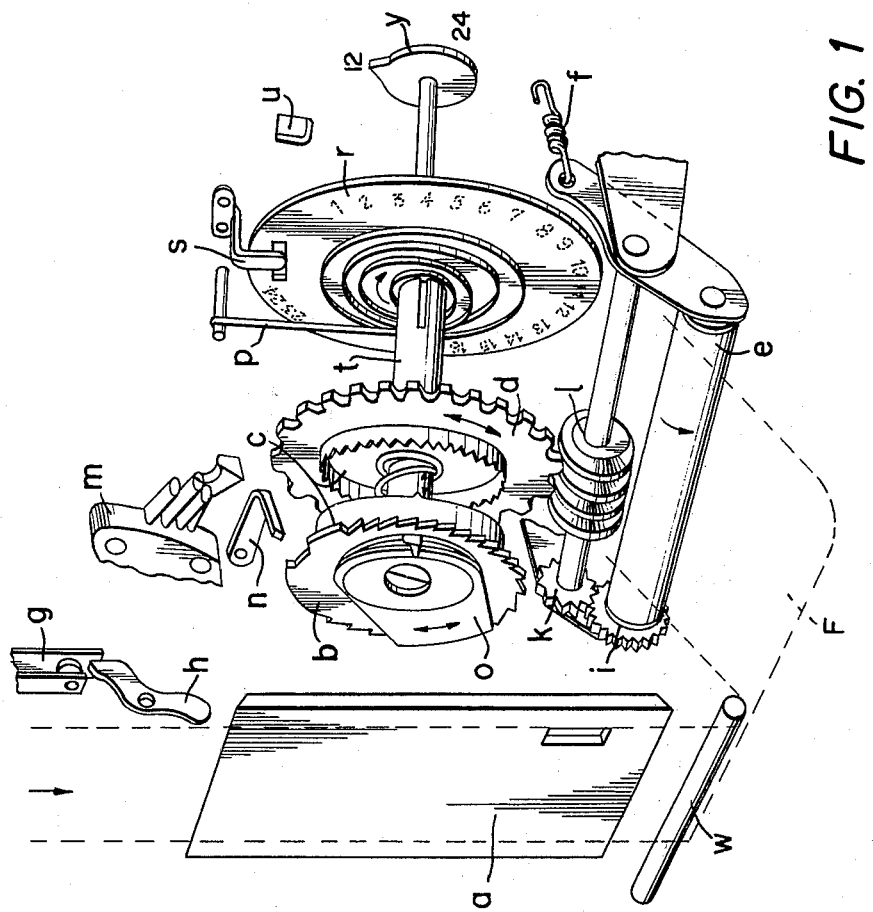
FIG. 1 is an exploded perspective view of the principal parts of the control mechanism according to a preferred embodiment of the invention.
Figure 2:
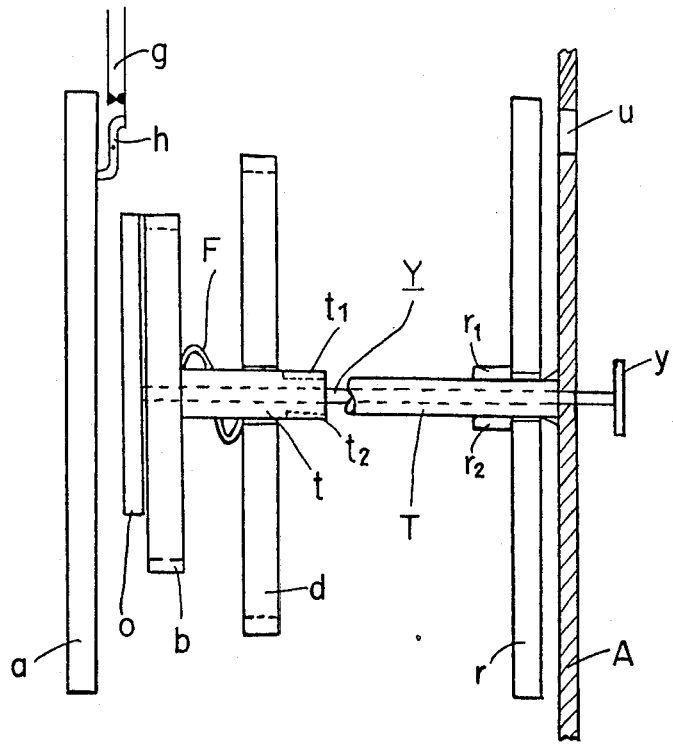
FIG. 2 is an exploded side elevational view of the same.

Referring first to FIGS. 1 and 2, the conventional camera parts such as lens, shutter, film supply spool, and film take-up spool are not illustrated. The camera includes a conventional film pressure plate $a$ mounted inside of and preferably supported from the back wall A of the camera. The entire back structure, including the main back wall A and the parts supported therefrom such as the pressure plate $a$, is movably mounted with respect to the main camera body, either being completely removable from and attachable to the body or, preferably, being hinged to the body in a manner well understood in the art, so that it may be swung out to an open position for the purpose of taking out exposed film and loading fresh film in the camera. All of this is well understood, and so is not illustrated here. When the back A is moved to its fully closed position, the pressure plate $a$ presses against the rear surface of the film shown at F, in the exposure area thereof, and presses the side edges of the film forwardly against the side edges of the film gate or film exposure opening which defines the focal plane of the camera, in known manner.

A hollow shaft T is fixed to the camera back wall or rear cover wall A and extends forwardly therefrom perpendicular to the focal plane. Another hollow shaft or sleeve $t$ surrounds the shaft T and is rotatable and axially slidable thereon. The forward end of this outer shaft $t$ is fixed to a metering disk or indexing disk $b$, which may also be referred to as a cam disk. The rear end of the shaft $t$ has two longitudinal slots $t_1$ and $t_2$, for coupling engagement with longitudinal or axial lugs or fins $r_1$ and $r_2$ fixed to and projecting forwardly from the forward face of a counting disk $r$ which is rotatable on the shaft T just in front of the rear wall A.

The cam disk $b$ has teeth $c$ in its periphery, of suitable size to control the metering of the film advance, as mentioned below. Projecting rearwardly from the disk $b$ are one or more teeth for coupling engagement with an annular series of teeth projecting forwardly from a disk $d$ which is rotatable on the shaft $t$. These coupling teeth on the disks $b$ and $d$ are best seen in FIG. 1. A coil spring $F_1$ between the disks $b$ and $d$ tends to move the disk $b$ forwardly to disengage the coupling teeth on the two disks. But when the camera back or rear cover A is closed, the disk $b$ or a part associated therewith comes into contact with the plate $a$ and this forces the disk $b$ rearwardly, compressing the spring $F_1$ and establishing coupling engagement between the teeth on the back of the disk $b$ and the teeth on the front of the disk $d$, so that thereafter these two disks must rotate together, so long as the camera back remains closed. At the same time this rearward motion of the disk $b$, caused by closing the camera back, moves the sleeve $t$ rearwardly on the shaft T, but the slots $t_1$ and $t_2$ are constantly engaged with the lugs $r_1$ and $r_2$ on the counting disk $r$, in all positions of the shaft $t_2$ so that thereafter all three of these parts $b$ and $d$, $r$ rotate together so long as the back cover of the camera remains closed.

A measuring roller $e$ is pressed against the rear face of the film F by a spring $f$, so that the roller is rotated by the advancing movement of the film. Through gearing $i$ and $k$ the rotation of the measuring roller turns a worm wheel $l$ which meshes with worm gear teeth on the periphery of the disk $d$. Thus the advance of the film causes rotation of the disk $d$, and with it the cam disk $b$ and the counting disk $r$. Successive numerals on the rear face of the counting disk are visible through a window $u$ in the back cover A, indicating the number of the film frame which is located in the focal plane ready for exposure. When the camera back is opened after all of the film is exposed, uncoupling the disks $b$ and $r$ from the disk $d$, a spring $p$ restores the counting disks $b$ and $r$ to their initial or starting position, determined by a fixed stop $s$. According to the particular type of film used, the measuring roller $e$ can be either smooth or provided with gear teeth for engagement in the perforation holes of the film if such film is used. In this latter case the disconnection operation at the end of the film can be carried out my means of a slip clutch.

A pivoted lever $h$ has one end opposite a small opening in the pressure plate $a$, and a spring (not shown) tends to move this end of the lever $h$ through the opening, to act as a feeler to sense the presence or absence of the film. The other end of the lever $h$ engages a resilient switch contact of the switch $g$. The parts are so arranged that when film is in proper position in the focal plane of the camera, the film presses the lever $h$ to such position as to allow the resilient switch contact to close the switch $g$. If there is no film in proper exposure position, the spring of the lever $h$ shifts the lever to a different position, overcoming the resilient spring action of the switch and opening the switch $g$.

The periphery of the cam disk or metering disk $b$ is formed with a series of cams, as seen in FIG. 1, the distances between gaps being adapted to the length of the film to be transported. The first cam corresponds to the length of the film from the conventional insertion mark as far as the first picture area. Each further cam then corresponds to the length of one picture frame; that is, to the length that the film must be transported or fed from one exposure to the next.

Figure 3:
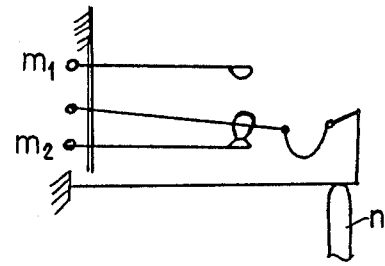
FIG. 3 is a detail of one of the electrical switches used in the control mechanism.

These cam surfaces or teeth on the disk $b$ control a second electrical switch $m$, seen in general in FIG. 1. As seen in greater detail in FIG. 3, the switch $m$ is a three-contact switch, having a central contact movable into engagement with one or the other of two contacts $m_1$ and $m_2$. A small spring connected with the central contact moves this contact into engagement with $m_1$ when the end of the spring is raised upwardly, and into contact with the other contact number $m_2$ when the spring is allowed to drop downwardly. This is a familiar construction commonly used in micro switches and will be well understood by those familiar with such switches. The switch $m$ is operated by the lever $n$ which rides on the periphery of the cam disk $b$. When the end of the lever $n$ drops into one of the notches of the disk $b$, it relieves the upward pressure on the switch $m$, so that this switch closes at $m_2$ and opens at $m_1$. When rotation of the disk $b$ continues so that the end of the lever $n$ rides up the next cam incline, it raises the switch $m$ so that the switch opens at $m_2$ and closes at $m_1$.

In order to adjust the number of the cam gaps or teeth of the cam disk $b$ to the number of exposures on the film being used at any particular time, there is a segment $o$ tight against the front face of the cam disk $b$, the segment being fixed on the front end of a small shaft Y which extends through the hollow shaft T and out through the back wall A to an accessible nob or finger piece $y$. By grasping the nobs $y$ the segment $o$ may be turned to any desired position relative to the disk $b$, and it will be frictionally retained in the position in which it is set. The periphery of the segment $o$ has the same height as the maximum height of the cams on the disk $b$, so that when, during the rotation of the disk $b$, the segment $o$ reaches the lever $n$, it will prevent the lever from dropping into further cam notches of the disk, thus signaling that the last exposure on this particular film has been made and keeping the switch $m$ closed at $m_1$ and open at $m_2$, being the proper position for winding off the balance or trailing strip of the film from the supply roll onto the film take-up roll.

A scale is associated with the nob $y$, as schematically indicated in FIG. 1, to enable the segment $o$ to be set to the desired position for the number of exposures on the film. The roller $w$ shown in FIG. 1 is a conventional guide roller for guiding the film as it leaves the film gate and proceeds to the measuring roller $i$, other conventional guide rollers being used wherever appropriate.

Figure 4:
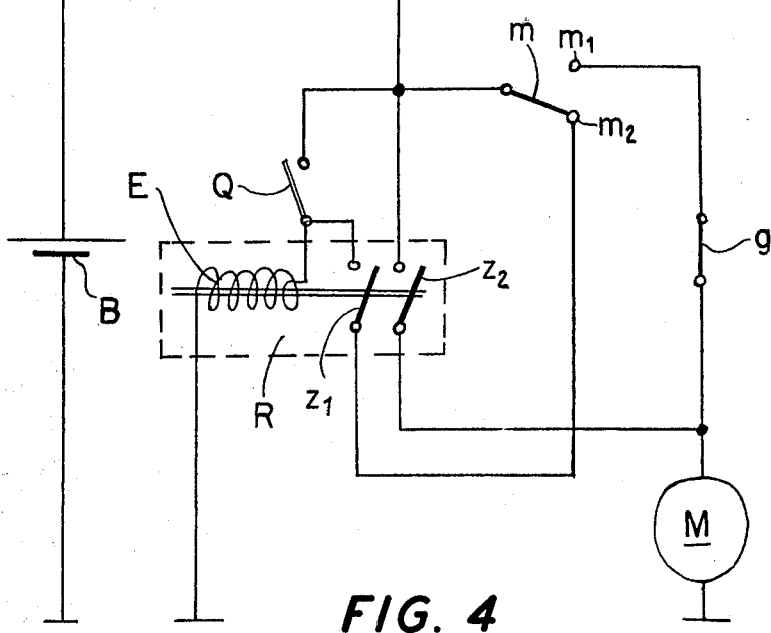
FIG. 4 is a schematic wiring diagram of the electrical circuit of the control mechanism.

The preferred electric circuit is shown schematically in FIG. 4. In addition to the switches $m$ and $g$ previously described, the circuit includes a battery B for providing the necessary power, a motor M operatively connected through any conventional gearing to the conventional take-up spool of the camera, and a relay R having an exciter coil E which, when energized, operates the relay to close the two normally open switches $z_1$ and $z_2$. In addition, there is a switch Q normally open but closed momentarily when one exposure has been completed and it is desired to feed the film to make the camera ready for the next exposure. This may be a push button switch momentarily closed by finger pressure, but preferably it is a switch operated automatically by the exposure cycle of the camera (with provision, if desired, for closing the switch by hand for initially feeding a fresh film to the first exposure position). For example, if the camera is of the pivoted reflex mirror type, the switch Q may be momentarily closed by the swinging action of the mirror as it swings back down from exposure position to viewing position. If the camera is not of the mirror reflex type, the switch Q can be closed momentarily by the movement of any suitable part of the shutter mechanism, arranged to close it during the last part of the shutter running down movement, after the exposure has been made and the shutter blades have closed. The details of a simple mechanical connection for closing the switch are well within the skill of the art in view of what has been said above.

These various electrical parts are connected in the circuit in the manner clearly apparent from FIG. 4, and it is thought that no further explanation is needed, except to describe the function and operation of the parts.

When a fresh film is inserted in the camera, the position of the segment $o$ is appropriately adjusted to the number of exposures on the film used, if it is not already in the correct position. At this time the cam disk $b$ and the counting disks $r$ will be in their initial starting positions, determined by the spring $p$ and $s$, because the disk $b$ is uncoupled from the disk $d$. After the fresh film has been inserted and drawn by hand across the focal plane support, the closing of the camera back cover A forces the cam disk $b$ slightly rearwardly to couple the teeth on the rear thereof to the teeth on the front of the disk $d$, which cannot turn except upon rotation of the worm gear $l$ produced by rotation of the measuring rollers $e$. At this time (the camera back cover having been closed) the switch $g$ will be closed because there is film in the focal plane and this film holds the feeler lever $h$ in a position allowing the switch $g$ to close.

Now if the switch Q is momentarily closed, this operates the relay R to close both of the switches $z_1$ and $z_2$. Through the closed switch $z_2$, power is supplied to the motor M to start winding the film from the initial insertion position to the first exposure position, and it will be noted that this is independent of the switch $g$ so that, even if, upon initial insertion of the film, the film has not been drawn far enough to close the switch $g$, the motor M will still run to advance the film to the first exposure position. At the same time, the closing of the switch $z_1$ supplies the coil E of the relay R with current independently of the switch Q, so long as the switch $m_2$ remains closed. So even though the switch Q was closed only momentarily and now is immediately opened again, the relay nevertheless remains energized so long as the switch $m$ remains in the $m_2$ position.

During this initial advance of the film toward the first exposure position, but before the film actually reaches the first exposure position, the lever $n$ rides up the first inclined cam of the disk $b$, and this shifts the switch $m$ from the $m_2$ position to the $m_1$ position. This immediately cuts off the current to the relay (the momentary switch Q having meanwhile opened) so that the switches $z_1$ and $z_2$ open. However, the motor M continues to run because current is supplied through the switch $m_1$ and through the switch $g$, the film by this time having been advanced far enough to make sure that the switch $g$ is closed even if it was not previously closed at the outset. So the motor M continues until the disk has turned far enough for the lever $n$ to drop into the first exposure notch of the cam piece $c$, which occurs just as the first exposure position of the film is reached. The dropping of the lever $n$ into the first notch moves the switch $m$ from the $m_1$ position to the $m_2$ position, thereby cutting off the current to the motor M and stopping the film advance.

The first exposure is now made on the film, by operating the camera in the conventional manner, not here shown, the details being unimportant for present purposes.

At the conclusion of the first exposure, the switch Q is momentarily closed as above explained, which again energizes the relay R, closes the two switches $z_1$ and $z_2$, and starts the film winding motor M, just as during the first feeding operation when the film was being initially fed to the first exposure position. The momentary switch Q immediately opens again, but the relay R stays energized through the switch $z_1$, as above explained, and the motor M remains operative through the relay switch $z_2$, until the lever $n$ rides up the cam far enough to cause the micro switch to snap over from the $m_2$ position to the $m_1$ position, whereupon the motor M continues to operate through the switches $m_1$ and $g$ until the lever $n$ drops down into the next notch of the cam disk $b$. This dropping of the lever shifts the micro switch $m$ back from the $m_1$ position to the $m_2$ position, stopping the motor and the film advance drive in the proper position for the next exposure.

The next exposure is now made, and the same process is repeated, as many times as necessary until the film is used up. After the last exposure, the film feeding motor continues to run, because the segment $o$ prevents the lever $n$ from dropping again, and so the motor winds the trailing strip of the film past the focal plane or exposure aperture until the trailing end of the film passes beyond the feeler lever $h$, which opens the switch $g$ as soon as this lever senses that there is no more film. Then the camera back can be safely opened to take out the roll of exposed film.

This construction is highly satisfactory and effective for the intended purpose. It is quite compact and can be easily built into a small hand camera without appreciably adding to the bulk of the camera. In FIGS. 1 and 2, it looks as though the construction were quite thick and would require a very thick back cover section on the camera, to accommodate this mechanism. But these FIGS. 1 and 2 are exploded views, for the sake of clarity of illustration. In the actual structure, the parts are much closer together in the direction of the thickness of the back cover, that is, in the direction of the axis of the shaft T, and the distance from the pressure plate $a$ to the back wall A of the back cover of the camera, is really quite small, so is accommodated in a thin back cover section.

What is claimed is:

1. Electrically driven film feeding mechanism for a roll film camera, comprising means forming a guide track for film to be advanced from one exposure position to another, an electric motor for advancing the film, electric circuit means for supplying power to said motor to cause it to operate to advance the film, cam means moved by feeding movement of the film, said cam means having a series of operative portions successively brought to a predetermined position when successive exposure areas of the film arrive successively at exposure position in said guide track, a first switch in said electric circuit means, and means responsive to the position of said cam means for opening said first switch each time that one of said operative portions of said cam means reaches said predetermined position.

2. A device as defined in claim 1, said circuit means further comprising a second switch effective when closed to supply power to said motor independently of power supplied through said first switch, said circuit means also comprising relay means effective when energized to close said second switch and effective when de-energized to open said second switch, a momentary switch effective when closed to energize said relay means for a short interval, and means for maintaining said relay energized thereafter as long as said first switch remains open.

3. A device as defined in claim 2, further comprising means operated by said cam means for closing said first switch during progress of advance of the film from one exposure position to the next exposure position.

4. A device as defined in claim 1, wherein said series of operative portions include a series of notches into which a movable member controlling said first switch may drop to open said first switch, and an adjustable member for blocking a selected number of said notches so that said movable member can not drop into them.

5. A device as defined in claim 4, wherein said adjustable member is a rotary segment rotatable with respect to said cam means, and an externally accessible manually operable member for turning said adjustable member to a position for blocking the desired number of said notches.

6. A device as defined in claim 1, wherein said circuit means includes a first circuit for supplying power to said motor, said first switch being in said first circuit, a second circuit also for supplying power to said motor, and a second switch in said second circuit.

7. A device as defined in claim 6, further comprising means for supplying power to said motor through said second circuit during an early part of each film feeding operation of said motor and for then supplying power to said motor through said first circuit during a later part of each film feeding operation of said motor.

8. A device as defined in claim 6, wherein one of said two circuits is ineffective to supply power to said motor so long as no film is present at a given point in said guide track and the other of said two circuits is independent of the presence or absence of film.

9. A device as defined in claim 1, further comprising a feeler member movably mounted to sense the presence or absence of film at a given point in said guide track, and a feeler-controlled switch in said circuit means arranged to open to shut off power to said motor when said feeler member senses the absence of film.

10. A device as defined in claim 2, wherein said first switch has two positions, in one of which it may complete a circuit to supply power to said motor and in the other of which it may supply power to said relay means, when energized, to keep the relay means energized.

* * * * *